United States Patent
Sakuma et al.

(10) Patent No.: US 6,209,934 B1
(45) Date of Patent: Apr. 3, 2001

(54) BUMPER ASSEMBLY FOR VEHICLES

(75) Inventors: Katsuzi Sakuma, Nagoya; Tsuyoshi Kamiya; Shinichi Haneda, both of Anjyo; Kazunari Azuchi, Himi; Toshiyuki Inagaki, Takaoka; Taku Matsutani, Toyama-ken; Kazunobu Nuno, Toyota, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/557,227

(22) Filed: Apr. 25, 2000

(30) Foreign Application Priority Data

Apr. 26, 1999 (JP) .................................................. 11-118059

(51) Int. Cl.⁷ .................................................. B60R 19/02
(52) U.S. Cl. .......................................... 293/120; 293/132
(58) Field of Search .................................... 293/120, 121, 293/122, 132, 133, 155

(56) References Cited

U.S. PATENT DOCUMENTS

| 4,457,547 | * | 7/1984 | Sekiyama et al. | 293/120 X |
| 5,201,912 | * | 4/1993 | Terada et al. | 293/120 |
| 6,000,738 | * | 12/1999 | Stewart et al. | 293/102 |

FOREIGN PATENT DOCUMENTS 4-303046   10/1992   (JP) .

* cited by examiner

Primary Examiner—Joseph D. Pape
(74) Attorney, Agent, or Firm—Burns, Doane, Swecker & Mathis, LLP

(57) ABSTRACT

To promote a function of absorbing impact energy produced by deforming a reinforcement member, at bond portions of a reinforcement member (10) intersecting with a front and a rear wall portion (11, 12) and an upper and a lower wall portion (13, 14), there are provided circular arc faces on outer sides of the bond portions having radii of curvature $R_1$ are larger than radii of curvature $R_2$ of circular arc faces on inner sides thereof.

6 Claims, 6 Drawing Sheets

BUMPER ASSEMBLY FOR VEHICLES

BACKGROUND OF THE INVENTION

The present invention relates to a bumper assembly for vehicles having an improved reinforcement member made of a metal.

In order to alleviate impact on a passenger or decrease a damage of a vehicle body in collision, a bumper assembly is attached to a front portion of a vehicle. One example thereof is disclosed in, for example, Japanese Patent Laid-Open Publication No. Hei 4-303046/1992. According thereto, as shown by FIG. 7, there is constructed a basic structure in which a hollow reinforcement member (bumper reinforcement) 2 made of a metal having a section substantially in a rectangular shape and extended in a width direction of the vehicle, is fixed to each of side members 1 on both sides of a front portion of the vehicle.

An absorber 3 comprising a urethane material and a bumper cover 4 constituting an exterior of the vehicle are arranged at a region frontward from the reinforcement member 2. The bumper cover 4 is fixed to the reinforcement member 2 and a cover supporting member 7 by using bolts or clips 5 and 6.

According to the example shown by FIG. 7, holes are perforated at a rear wall portion of the reinforcement member 2 and energy absorbing members 8 are arranged at inside of the reinforcement member 2 via the holes. The energy absorbing member 8 is constituted in a shape of a pipe comprising an aluminum alloy or a fiber reinforced resin and press-inserted into the hole of the reinforcement member 2. A front end thereof is brought into contact with a front wall portion of the reinforcement member 2 and a rear end thereof is brought into contact with a front face of the side member 1.

When impact is applied on the bumper assembly in collision of the vehicle, the reinforcement member (bumper reinforcement) 2 is deformed. According to the deformation of the reinforcement member 2, an upper wall portion and a lower wall portion are deformed to buckle toward outer sides such that the front wall portion becomes proximate to the rear wall portion and the energy absorbing members 8 are compressed to deform in a bellow-like shape. Thereby, as shown by FIG. 8, there is provided a characteristic of an energy absorbing amount (E/A amount) indicating a long and low displacement region and a high yield load A.

According to the conventional bumper assembly, as shown by FIG. 8, although there is observed rapid energy absorption caused by buckling the reinforcement member, thereafter, regardless of adding the energy absorbing members, there is indicated the long and low displacement region and the energy absorbing function is not high.

Further, there are needed the energy absorbing members other than the reinforcement member and accordingly, a number of parts is increased, which is disadvantageous in view of the cost and in view of the productivity.

According to the deformation of the reinforcement member, the upper wall portion and the lower wall portion are deformed to buckle on the outer sides and therefore, there is a concern that the deformation interferes with functional parts (head light, winker lamps and so on) other than the bumper assembly and destruction thereof is caused, which is not preferable.

SUMMARY OF THE INVENTION

Hence, it is a problem of the invention to resolve the drawback of the conventional technology, mentioned above.

According to the invention, in order to resolve the above-described problem, basically, there is used technical means or conception in which radii of curvature of corners (circular arcs) on outer sides of portions connecting a front and a rear wall portion and an upper and a lower wall portion of a reinforcement member (bumper reinforcement), are made larger than radii of curvature of corners (circular arcs) on inner sides thereof and in deforming the reinforcement member, the upper wall portion and the lower wall portion are bent toward inner sides. At this occasion, the upper wall portion and the lower wall portion deformed to buckle toward the inner sides will interfere with the rear wall portion, as a result, the upper wall portion and the lower wall portion are deformed in a bellow-like shape, thereby, there is achieved operation and effect in which there is provided a characteristic of a long and high deformation region and a high yield load, that is, a characteristic having a large energy absorbing amount (E/A amount) without using energy absorbing members as in the conventional case.

Further, the upper wall and the lower wall are deformed to buckle on the inner sides and accordingly, there is no concern that the upper wall and the lower wall interfere with functional parts other than the bumper apparatus.

Specifically, according to an aspect of the invention, there is provided a bumper assembly for vehicles which is a bumper apparatus fixed to side members of a vehicle and having a reinforcement member having a section substantially in a rectangular shape wherein the reinforcement member comprises a front and a rear wall portion and an upper and a lower wall portion for connecting the front and the rear wall portions, the upper and the lower wall portions are disposed on inner sides of upper and lower edges of the front and the rear wall portions and when impact load is operated on the front wall portions, at least a portion of the upper and the lower wall portions of portions of the reinforcement member fixed to the side members is bent to deform to the inner sides and in a direction of the rear wall portion.

DETAILED DESCRIPTION OF THE PREFERRED EMBODIMENTS

Figure 1:
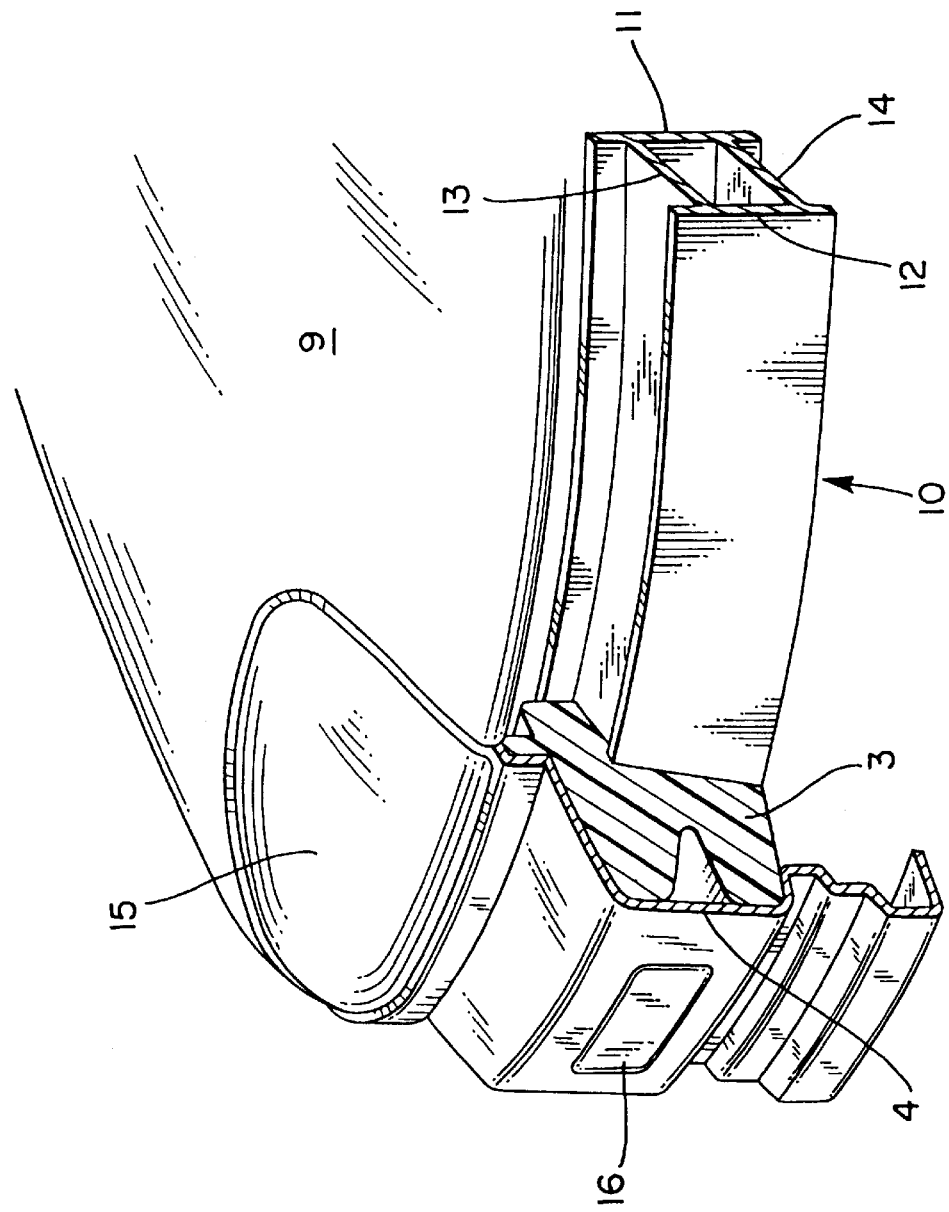
FIG. 1 is a partial perspective view showing a front portion of a vehicle.

In an example shown in FIG. 1, a reinforcement member 10 made of a metal adapted to be fixed to side members (not illustrated) on both sides of a front portion of a vehicle 9 by welding, is constituted by a section substantially in a rectangular shape comprising a front and a rear wall portion 12 and 11 and an upper and a lower wall portion 13 and 14 and at a region frontward therefrom, an absorber 3 and a bumper cover 4 are arranged as in the conventional apparatus. Numeral 15 in FIG. 1 designates a head light and numeral 16 designates a winker lamp.

Figure 2:
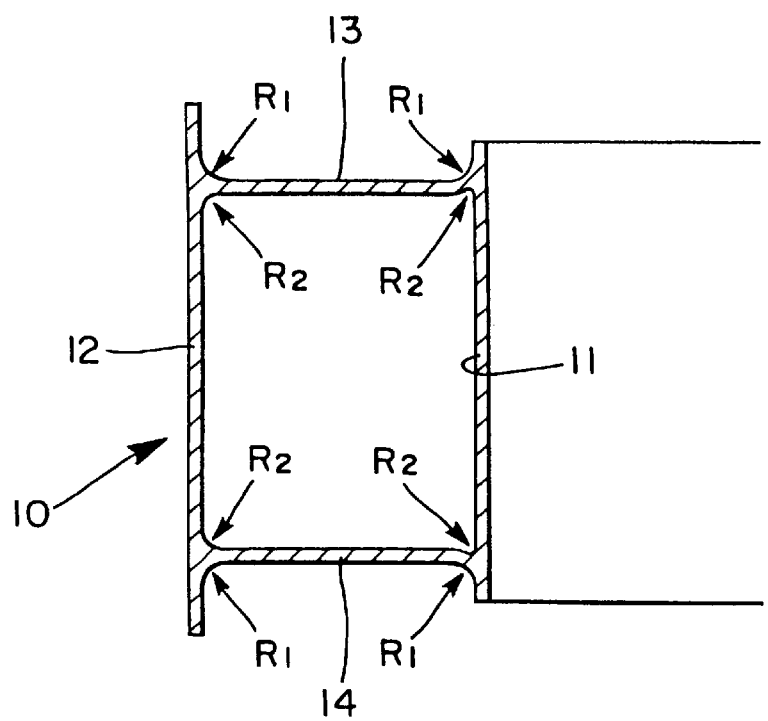
FIG. 2 is a sectional view of a reinforcement member according to a first embodiment of the invention.

FIG. 2 shows the section of the reinforcement member 10 newly developed by the present invention. With regard to radii of curvature (R) of chamfered or circular arc faces (corner portions) on inner sides and outer sides of bond portions of the front and the rear wall portions 12 and 11 and the upper and the lower wall portions 13 and 14 (disposed on inner sides of upper and lower edges of the upper and the lower wall portions 13 and 14), each ($R_1$) of the radii of curvature on the outer sides are made larger than each ($R_2$) of the radii of curvature on the inner sides. Thereby, directions of buckling deformation (bending) of the upper and lower wall portions 13 and 14 are controlled to the inner sides.

Figure 3:
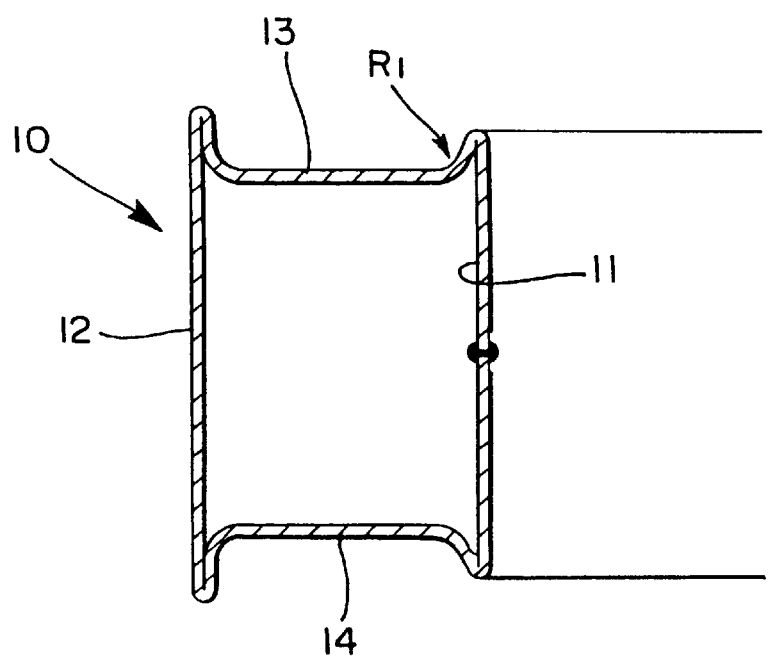
FIG. 3 is a sectional view of a reinforcement member according to a second embodiment of the invention.

Although according to the example shown by FIG. 2, the reinforcement member 10 is provided by extrusion of an aluminum-based alloy, as shown by FIG. 3, the reinforcement member 10 may be provided by roll-forming a high tensile steel plate and welding two edges butted portions thereof. In this case, although circular arc faces having the radii of curvature of $R_2$ on the inner sides as in the example shown by FIG. 2, cannot be formed, circular arc faces of the radii of curvature of $R_1$ on the outer sides are made larger than those of a normal roll-formed product.

Further, press-forming may be used in place of roll-forming.

There are shown states in which impact is applied on the bumper apparatus using the reinforcement member 10 shown by FIG. 2 or FIG. 3, the reinforcement member 10 is deformed and impact energy is absorbed, in FIGS. 4(a) through 4(d) and FIGS. 5(a) through 5(d).

Figure 4:
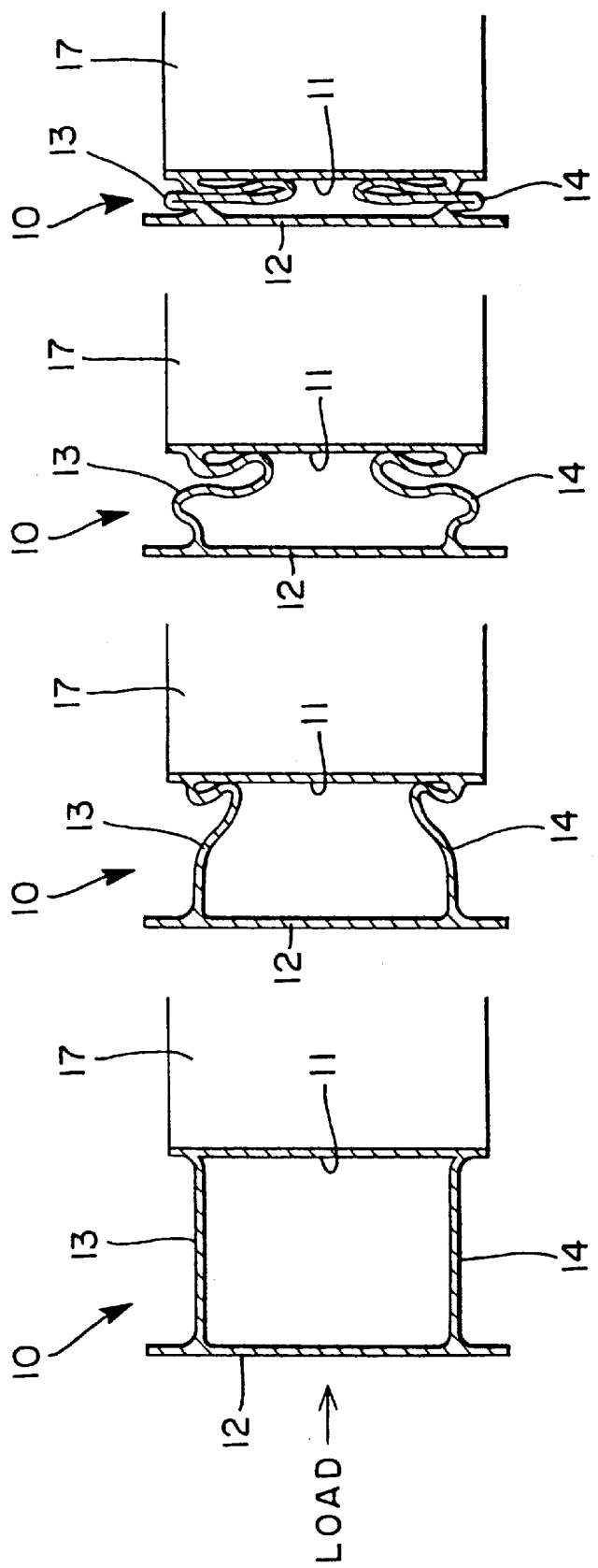
FIGS. 4(a) through 4(d) are sectional views showing deformation of an upper and a lower wall portion of the reinforcement member at a portion of the reinforcement member fixed to a side member.

FIGS. 4(a) through 4(d) show deformation of the reinforcement member 10 at a portion of the reinforcement member 10 fixed with the side member 17. As shown by FIG. 4(b), when load is applied on the front wall portion 12, rear portions of the upper and the lower wall portions 13 and 14 are deformed to buckle (bent) on the inner sides, while increasing an amount of covering an inner wall face of the rear wall portion 11 by the bent portions, finally, as shown by FIG. 4(d), the reinforcement member 10 is compressed to deform (deform) in a bellow-like shape such that the front wall portion 12 becomes as proximate to the rear wall portion 11 as possible and the deformation is finished.

Figure 5:
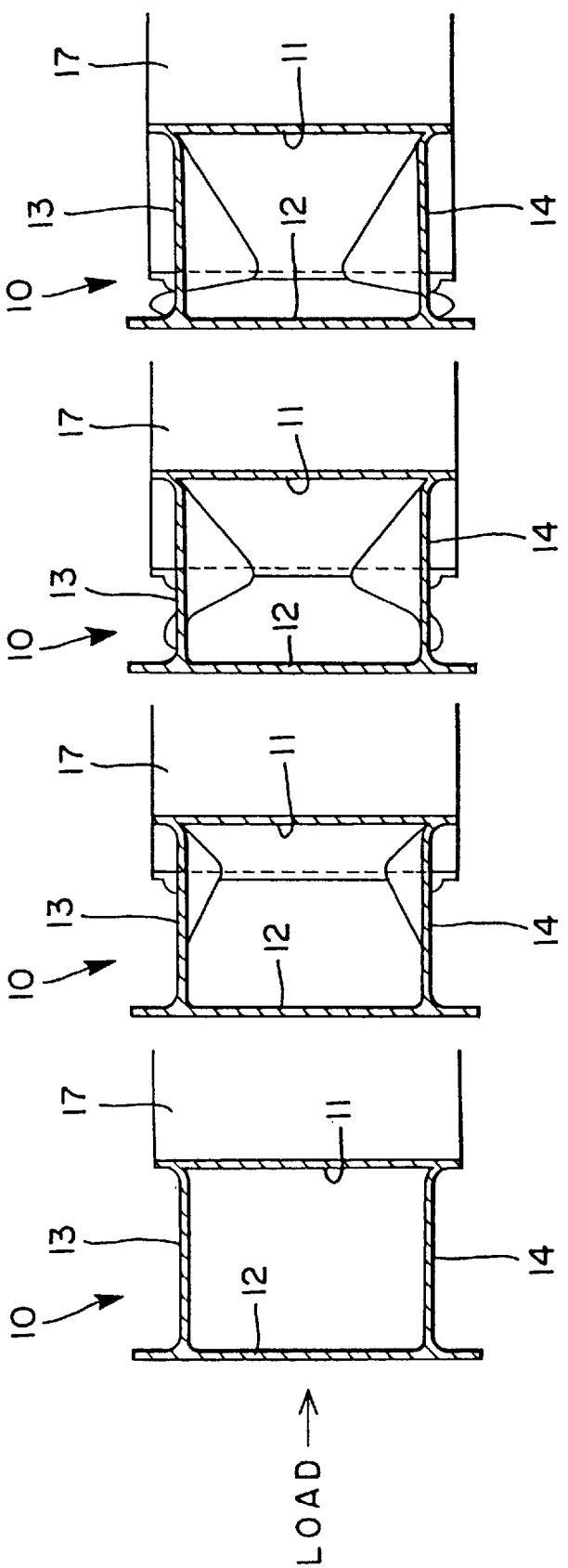
FIGS. 5(a) through 5(d) are sectional views showing backward movement of a neutral portion of the reinforcement member.

FIGS. 5(a) through 5(d) show movement of the reinforcement member 10 at its neutral portion at the center of the two side members 17. When the upper and the lower wall portions 13 and 14 at portions thereof fixed with the side members 17 start deforming as shown by FIG. 4(b), the deformation is transmitted to the neutral portion, finally, as shown by FIGS. 5(c) and 5(d), the neutral portion retreats rearwardly while maintaining an original shape thereof and a total deformation volume of the upper and lower wall portions 13 and 14 of the reinforcement member 10 to the inner sides is increasing.

Figure 6:
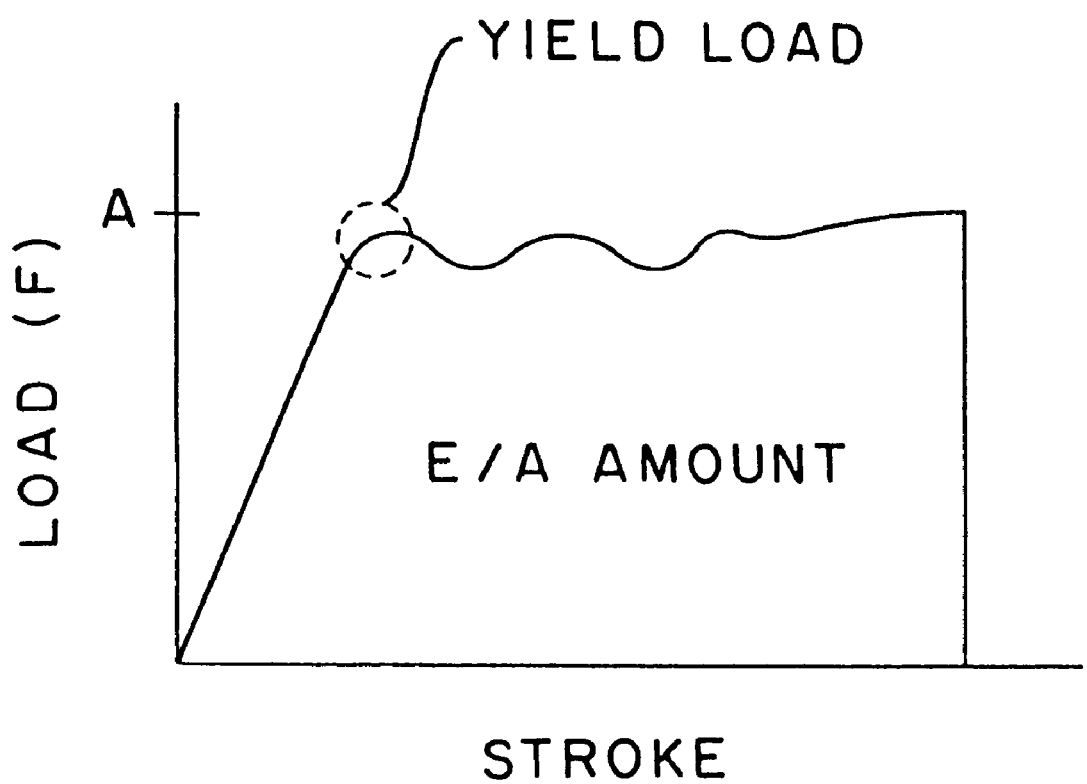
FIG. 6 is a graph diagram showing a relationship between backward stroke of the reinforcement member and load.
Figure 7:
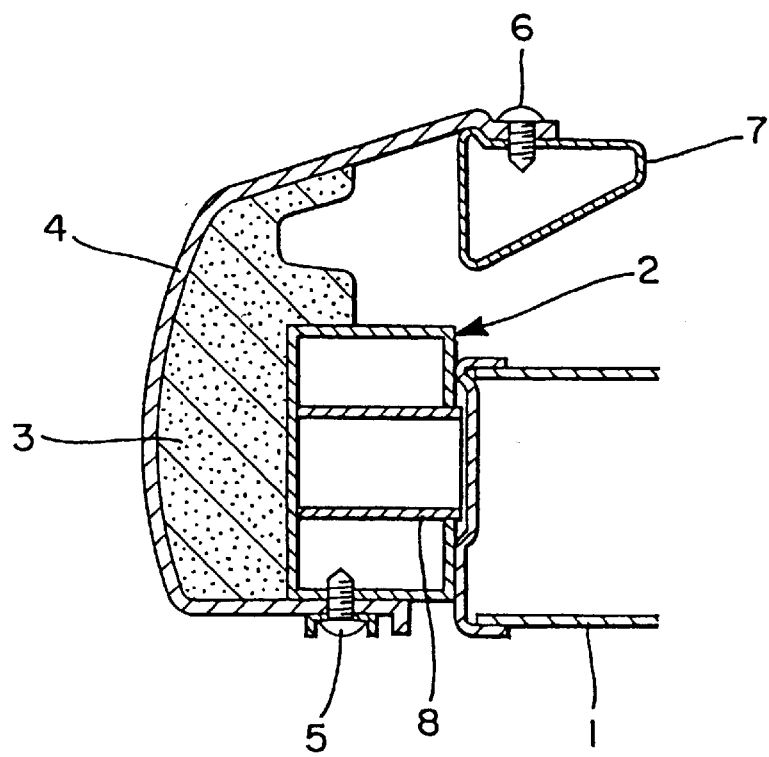
FIG. 7 is a sectional view of a conventional bumper apparatus.
Figure 8:
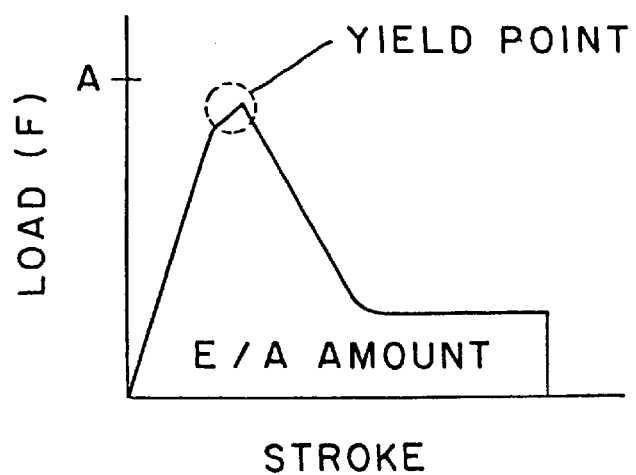
FIG. 8 is a graph diagram showing energy absorbing function of the conventional bumper apparatus.

Such deformation of the upper and lower wall portions 13 and 14 indicates an energy absorbing function in a form in which high yield load A is maintained during a long period of time as shown by FIG. 6 and absorption of impact can be carried out efficiently.

Further, the reinforcement member 10 may be constituted by adding a single or a plurality of ribs (not illustrated) connecting the upper and lower wall portions 12 and 11 between the upper and lower wall portions 13 and 14. Thereby, the yield load A can further be increased.

As many apparently widely different embodiments of the present invention can be made without departing from the spirit and scope thereof, it is to be understood that the invention is not limited to the specific embodiments thereof except as defined in the appended claims.

What is claimed is:

1. A bumper assembly for a vehicle, comprising:

a reinforcement member having a section substantially in a rectangular shape adapted to be fixed to side members of the vehicle;

an absorber made of a synthetic resin and attached to at least the front wall of the reinforcement member; and a bumper cover covering the absorber;

the reinforcement member including a front and a rear wall portion and an upper and a lower wall portion for connecting the front and the rear wall portions, the upper and the lower wall portions being disposed on inner sides of upper and lower edges of the front and the rear wall portions and when impact load is operated on the front wall portions, at least a portion of the upper and the lower wall portions of portions of the reinforcement member fixed to the side members being bent to deform to the inner sides and in a direction of the rear wall portion.

2. The bumper assembly according to claim 1, wherein radii of curvature of circular arc faces including chamfered portions of outer sides of bond portions bonding the front and the rear wall portions and the upper and the lower wall portions are larger than radii of curvature of circular arc faces including chamfered portions on inner sides of the bond portions.

3. The bumper assembly according to claim 1, wherein the reinforcement member is constituted by roll-forming or press-forming of a steel plate to thereby form circular arc faces on outer sides of bond portions bonding the front and the rear wall portions and the upper and the lower wall portions.

4. A reinforcement member for a vehicular bumper apparatus, which has a section substantially in a rectangular shape and is adapted to be fixed to side members of a vehicle, comprising:

a front and a rear wall portion; and an upper and a lower wall portion which are disposed on inner sides of upper and lower edges of the front and the rear wall portions, when impact load is operated on the front wall portions, at least a portion of the upper and the lower wall portions of portions of the reinforcement member fixed to the side members being bent to deform to the inner sides and in a direction of the rear wall portion.

5. The reinforcement member according to claim 4, wherein radii of curvature of circular arc faces including chamfered portions of outer sides of bond portions bonding the front and the rear wall portions and the upper and the lower wall portions are larger than radii of curvature of circular arc faces including chamfered portions on inner sides of the bond portions.

6. The reinforcement member according to claim 5, wherein the reinforcement member is constituted by roll-forming or press-forming of a steel plate to thereby form circular arc faces on outer sides of bond portions bonding the front and the rear wall portions and the upper and the lower wall portions.

* * * * *